US008392096B2

(12) United States Patent
Mathews et al.

(10) Patent No.: US 8,392,096 B2
(45) Date of Patent: *Mar. 5, 2013

(54) CYLINDER COMBUSTION PERFORMANCE MONITORING AND CONTROL

(75) Inventors: David S. Mathews, Howell, MI (US); Tameem K. Assaf, Milford, MI (US); John V. Bowman, Farmington, MI (US); Kenneth J. Buslepp, Brighton, MI (US); Julian R. Verdejo, Farmington, MI (US)

(73) Assignee: GM Global Technology Operations LLC

(*) Notice: Subject to any disclaimer, the term of this patent is extended or adjusted under 35 U.S.C. 154(b) by 315 days.

This patent is subject to a terminal disclaimer.

(21) Appl. No.: 12/762,523

(22) Filed: Apr. 19, 2010

(65) Prior Publication Data

US 2011/0253101 A1 Oct. 20, 2011

(51) Int. Cl.
*G06F 19/00* (2011.01)

(52) U.S. Cl. ............... 701/111; 123/406.11; 123/406.14

(58) Field of Classification Search .......... 701/103–105, 701/110, 111, 114; 123/406.11, 406.14, 123/406.19, 406.23–406.25
See application file for complete search history.

(56) References Cited

U.S. PATENT DOCUMENTS

| | | | | |
|---|---|---|---|---|
| 7,325,446 | B1 * | 2/2008 | Assaf et al. | 73/114.12 |
| 7,353,803 | B2 | 4/2008 | Mathews | 701/111 |
| 7,500,470 | B2 | 3/2009 | Buslepp | 123/436 |
| 7,654,248 | B2 | 2/2010 | Buslepp | 123/436 |
| 8,027,782 | B2 * | 9/2011 | Assaf et al. | 701/111 |
| 2010/0083936 | A1 | 4/2010 | Verdejo et al. | |
| 2011/0253100 | A1 * | 10/2011 | Kaiser et al. | 123/406.24 |

FOREIGN PATENT DOCUMENTS

| | | | |
|---|---|---|---|
| CN | 1204003 | A | 1/1999 |
| CN | 101331305 | A | 12/2008 |
| JP | 2009174397 | A | 8/2009 |

OTHER PUBLICATIONS

U.S. Appl. No. 12/357,776, filed Jan. 22, 2009, Julian Verdejo et al.
U.S. Appl. No. 12/478,159, filed Jun. 4, 2009, Julian Verdejo et al.
U.S. Appl. No. 12/762,516, filed Apr. 19, 2009, Jeffrey M. Kaiser et al.
Chinese Search Report for corresponding Chinese Application No. CN201110097845.3, (2 pages).

* cited by examiner

*Primary Examiner* — John Kwon

(57) ABSTRACT

An engine control system includes a disturbance module, a misfire threshold determination module, a disturbance ratio module, and a spark control module. The disturbance module determines a disturbance value for a past combustion stroke of a cylinder based on rotation of a crankshaft. The misfire threshold determination module determines a jerk value indicative of a misfire within the cylinder. The disturbance ratio module determines a disturbance ratio for the past combustion stroke based on the disturbance value and the jerk value. The spark control module determines a spark timing for a future combustion stroke of the cylinder, determines a spark timing correction for the future combustion stroke based on the disturbance ratio, determines a corrected spark timing based on the spark timing and the spark timing correction, and generates spark during the future combustion stroke based on the corrected spark timing.

20 Claims, 7 Drawing Sheets

CYLINDER COMBUSTION PERFORMANCE MONITORING AND CONTROL

CROSS-REFERENCE TO RELATED APPLICATIONS

This application is related to U.S. patent application Ser. No. 12/762,516 filed on Apr. 19, 2010. The disclosure of the above application is incorporated herein by reference in its entirety.

FIELD

The present disclosure relates to internal combustion engines and more particularly to combustion control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes an engine that generates torque. The engine transfers torque to a transmission via a crankshaft. The vehicle moves when torque is transferred to one or more wheels (not shown) of the vehicle. A crankshaft sensor generates a crankshaft signal based upon the rotation of the crankshaft.

An engine misfire may disturb the rotation of the crankshaft and may therefore cause a fluctuation in the crankshaft signal. Engine misfire may occur for a number of reasons, such as improper delivery of fuel, air, and/or spark. A misfire detection module receives the crankshaft signal and determines whether engine misfire has occurred based upon the crankshaft signal. In some instances, the individual cylinders do not produce an equivalent amount of drive torque. That is to say, some cylinders can be weaker than others, resulting in a torque imbalance across the cylinders. Such torque imbalances can generate noticeable vibrations in the driveline and can even be felt by a driver of the vehicle.

SUMMARY

An engine control system includes a disturbance module, a misfire threshold determination module, a disturbance ratio module, and a spark control module. The disturbance module determines a disturbance value for a past combustion stroke of a cylinder based on rotation of a crankshaft. The misfire threshold determination module determines a jerk value indicative of a misfire within the cylinder. The disturbance ratio module determines a disturbance ratio for the past combustion stroke based on the disturbance value and the jerk value. The spark control module determines a spark timing for a future combustion stroke of the cylinder, determines a spark timing correction for the future combustion stroke based on the disturbance ratio, determines a corrected spark timing based on the spark timing and the spark timing correction, and generates spark during the future combustion stroke based on the corrected spark timing.

An engine control method includes: determining a disturbance value for a past combustion stroke of a cylinder based on rotation of a crankshaft; determining a jerk value indicative of a misfire within the cylinder; determining a disturbance ratio for the past combustion stroke based on the disturbance value and the jerk value; determining a spark timing for a future combustion stroke of the cylinder; determining a spark timing correction for the future combustion stroke based on the disturbance ratio; determining a corrected spark timing based on the spark timing and the spark timing correction; and generating spark during the future combustion stroke based on the corrected spark timing.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
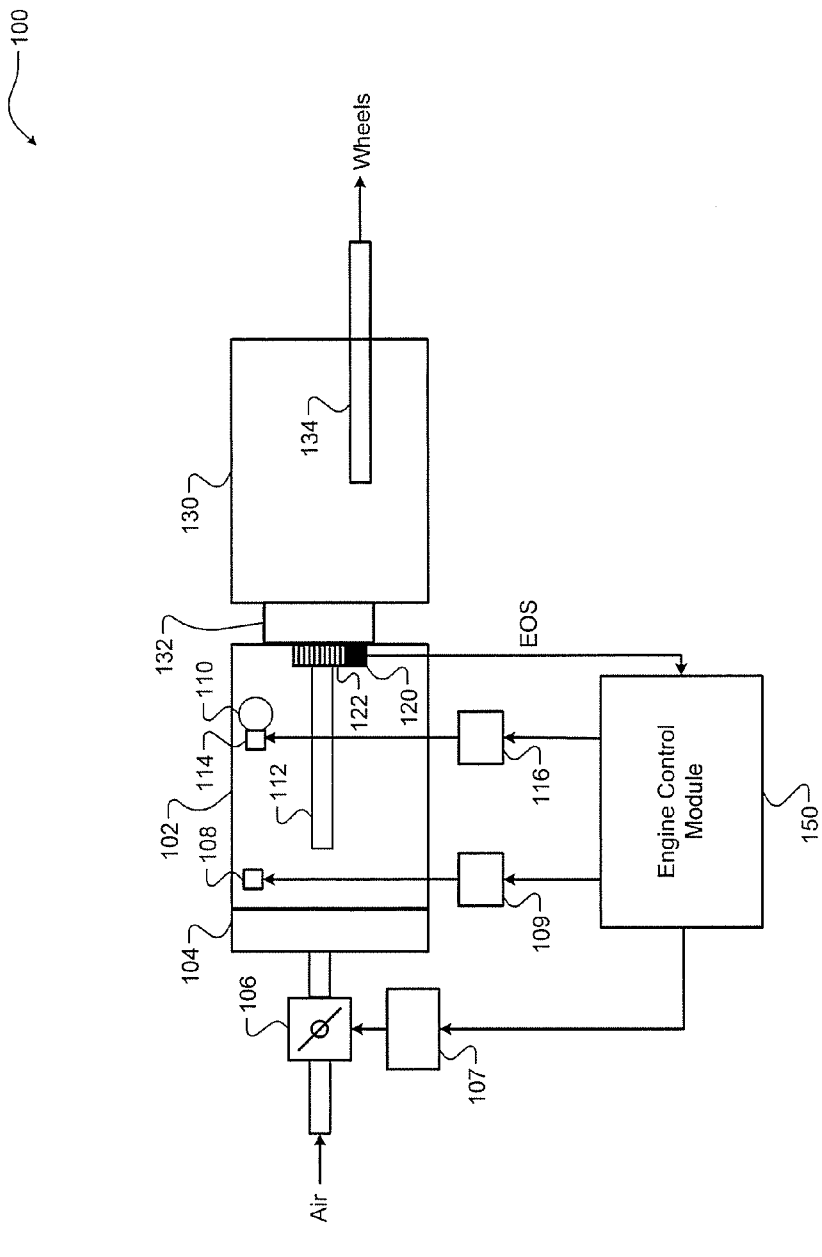
FIG. 1 is a functional block diagram of an exemplary vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A control module selectively diagnoses that a misfire occurred within in a cylinder of an engine based on rotation of a crankshaft during a combustion stroke of the cylinder. The control module monitors a rotational speed of the crankshaft during the combustion stroke of the cylinder. The control module determines a first derivative of the speed (i.e., acceleration) during the combustion stroke and a second derivative of the speed (i.e., jerk) during the combustion stroke. For example only, the control module may diagnose that a misfire occurred in the cylinder when the acceleration and jerk values are less than predetermined acceleration and jerk values, respectively.

The control module determines a disturbance value for the combustion stroke of the cylinder based on the acceleration and jerk values. The control module determines the disturbance value for the combustion stroke of the cylinder further based on a jerk value determined based on rotation of the crankshaft during a combustion stroke of a next cylinder in a predetermined firing order.

The control module of the present disclosure determines a disturbance ratio for the combustion event of the cylinder based on the disturbance value and the predetermined jerk value. The control module selectively determines a torque correction for a future (e.g., next) combustion event of the cylinder based on the disturbance ratio. The control module selectively adjusts a spark timing for the future combustion stroke based on the torque correction. The control module may also adjust the spark timings for future combustion events of other cylinders based on torque corrections determined for the other cylinders, respectively. In this manner, the control module balances torque production such that cylinder and the other cylinders each produce approximately the same amount of torque.

Referring now to FIG. 1, a functional block diagram of an exemplary vehicle system 100 is presented. An engine 102 generates torque. For purposes of discussion only, the engine 102 will be discussed as a gasoline type internal combustion engine.

Air is drawn into the engine 102 through an intake manifold 104. The volume of air drawn into the engine 102 may be varied by a throttle valve 106. A throttle actuator module 107 (e.g., an electronic throttle controller) controls opening of the throttle valve 106. One or more fuel injectors, such as fuel injector 108, mix fuel with the air to form a combustible air/fuel mixture. A fuel actuator module 109 controls the fuel injectors.

A cylinder 110 includes a piston (not shown) that is coupled to a crankshaft 112. Although the engine 102 is depicted as including only the cylinder 110, the engine 102 includes more than one cylinder. Combustion of the air/fuel mixture may include four-strokes: an intake stroke, a compression stroke, a combustion (or expansion) stroke, and an exhaust stroke. During the intake stroke, the piston is lowered to a bottom most position and the air and fuel are introduced into the cylinder 110. The bottom most position may be referred to as a bottom dead center (BDC) position.

During the compression stroke, the crankshaft 112 drives the piston toward a top most position, thereby compressing the air/fuel mixture within the cylinder 110. The top most position may be referred to as a top dead center (TDC) position.

The expansion stroke begins when, for example, spark from a spark plug 114 ignites the air/fuel mixture. A spark actuator module 116 controls the spark plug 114. Combustion of the air/fuel mixture drives the piston toward the BDC position, thereby rotatably driving the crankshaft 112. This rotational force (i.e., torque) may be the compressive force that compresses the air/fuel mixture during the compression stroke of a next cylinder in a predetermined firing order of the cylinders. Exhaust gas resulting from the combustion of the air/fuel mixture is expelled from the cylinder 110 during the exhaust stroke.

An engine output speed (EOS) sensor 120 measures rotational speed of the crankshaft 112 and generates an EOS signal indicating the EOS. For example only, the EOS sensor 120 may include a variable reluctance (VR) sensor or another suitable type of EOS sensor. The EOS sensor 120 may generate pulses when a tooth of an N-toothed wheel 122, which rotates with the crankshaft 112, passes the EOS sensor 120.

Accordingly, each pulse may correspond to an angular rotation of the crankshaft 112 by an amount equal to 360° divided by N teeth. For example only, the N-toothed wheel 122 may include 60 equally spaced teeth (i.e., N=60) and each pulse may correspond to 6° of rotation of the crankshaft 112. In various implementations, one or more of the N equally spaced teeth may be omitted. For example only, two of the N teeth may be omitted. The one or more teeth may be omitted, for example, as an indicator of one revolution of the crankshaft 112. The EOS sensor 120 may generate the EOS based on a period between the pulses. For example only, the EOS sensor 120 may generate the EOS based on a period that it takes the crankshaft 112 to rotate a predetermined angle (e.g., 90°) during the expansion stroke of the cylinder 110.

A misfire may occur within the cylinder 110 for a number of reasons, such as improper delivery of fuel, air, and/or spark. A misfire may disturb the rotation of the crankshaft 112. Accordingly, a misfire may cause a fluctuation in the EOS signal.

The engine 102 may transfer torque to a transmission 130 via the crankshaft 112. Torque may be transferred from the engine 102 to the transmission 130 via a torque transfer device 132, such as a torque converter where the transmission 130 is an automatic-type transmission. The transmission 130 may transfer torque to one or more wheels (not shown) via a transmission output shaft 134 and a driveline (not shown).

An engine control module (ECM) 150 controls the torque output by the engine 102 (i.e., torque about the crankshaft 112). The ECM 150 may control the torque output by the engine 102 by controlling one or more engine actuators. The ECM 150 provides each engine actuator with an associated actuator value. For example only, engine actuators may include the throttle actuator module 107, the fuel actuator module 109, and the spark actuator module 116. The associated actuator values may be opening area of the throttle valve 106, amount of fuel or fueling rate, and spark timing, respectively.

While not shown in the exemplary embodiment of FIG. 1, the ECM 150 may also control other engine actuators. For example only, the ECM 150 may control a boost actuator module that controls boost provided by a boost device, an exhaust gas recirculation (EGR) actuator module that controls opening of an EGR valve, a phaser actuator module that controls intake and exhaust cam phaser positions, and/or other suitable engine actuators.

Figure 2:
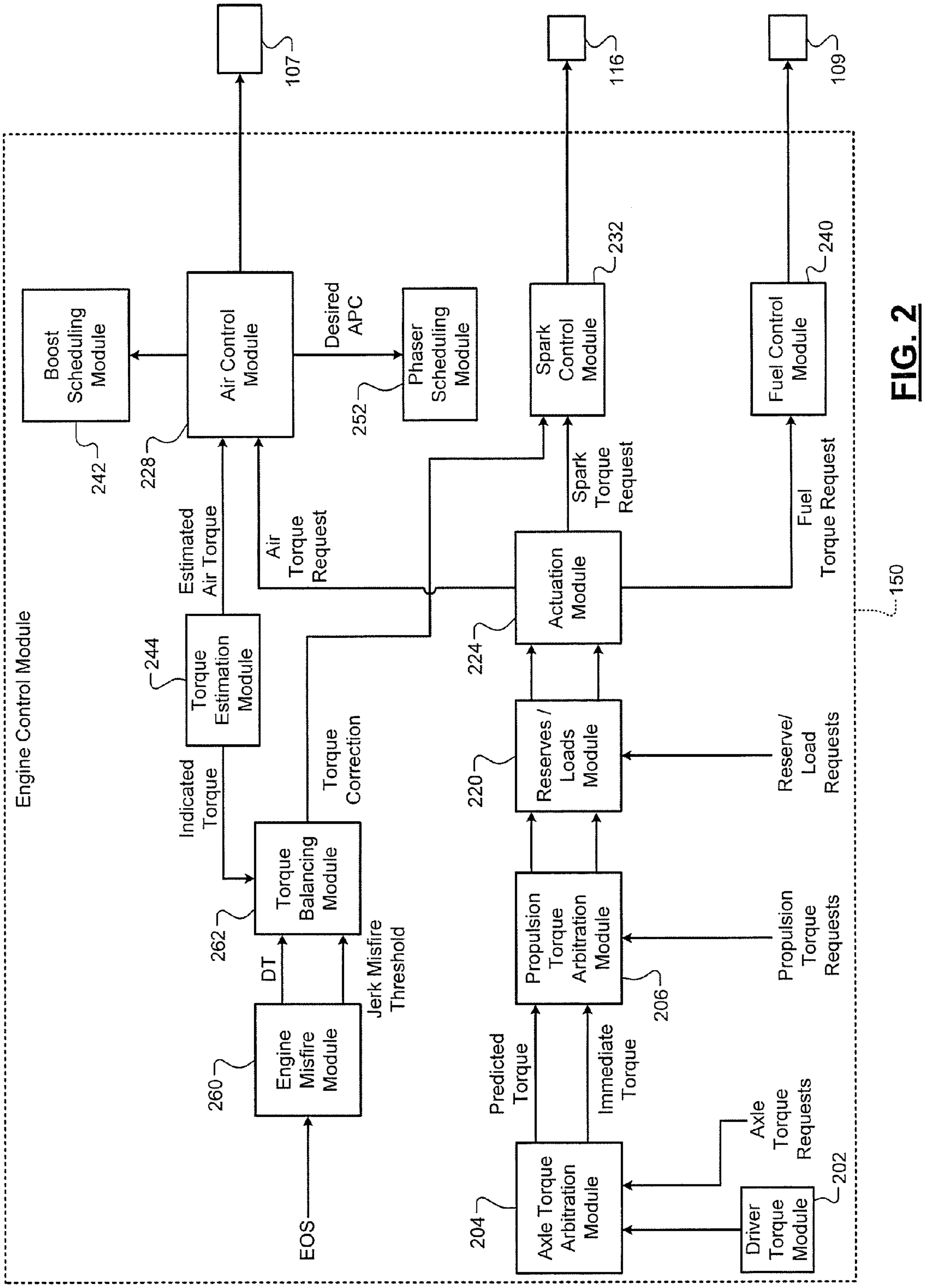
FIG. 2 is a functional block diagram of an exemplary engine control system according to the principles of the present disclosure.

Referring now to FIG. 2, a functional block diagram of an exemplary engine control system is presented. An exemplary implementation of the ECM 150 includes a driver torque module 202. The driver torque module 202 may determine a driver torque request based on driver input. The driver input may be based on an accelerator pedal position and/or a brake pedal position. The driver input may also be based on cruise control, which may be an adaptive cruise control system that varies vehicle speed to maintain a predetermined following distance. The driver torque module 202 may include one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including the engine 102 and/or an electric motor.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 150 before being used to control the engine actuators.

In general terms, the immediate torque request output by the axle torque arbitration module 204 is the amount of currently desired axle torque, and the predicted torque request the axle torque arbitration module 204 is the amount of axle torque that may be needed on short notice. The ECM 150 controls the engine actuators to produce axle torque equal to the immediate torque request. However, different combinations of actuator values may result in production of the same axle torque. The ECM 150 may therefore adjust the actuator values to allow a faster transition to the predicted torque request, while still maintaining the axle torque at the immediate torque request.

In general terms, the difference between the immediate torque request and the (presumably) higher predicted torque request can be referred to as a torque reserve. The torque reserve may represent the amount of additional torque that the engine 102 can begin to produce with minimal delay. Fast engine actuators are used to increase or decrease current axle torque. As described in more detail below, fast engine actuators are defined relative to slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators.

For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 150 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 150 may set actuator values for slow actuators to values that would enable the engine 102 to produce the predicted torque request if the fast actuators were set to appropriate values. Meanwhile, the ECM 150 may set actuator values for fast actuators to values that, given the slow actuator values, cause the engine 102 to produce the immediate torque request instead of the predicted torque request.

The fast actuator values therefore cause the engine 102 to produce the immediate torque request. When the ECM 150 decides to transition from the immediate torque request to the predicted torque request, the ECM 150 changes the actuator values for one or more fast actuators to values to achieve the predicted torque request. Because the slow actuator values have already been set based on the predicted torque request, the engine 102 is able to produce the predicted torque request after only the delay imposed by the fast actuators. In other words, the longer delay that would otherwise result from changing using slow actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in immediate torque request. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in engine output torque to be made by varying fast actuators via the immediate torque request while maintaining the values of the slow actuators. For example, to maintain a given idle speed, the immediate torque request may vary within a range. If the predicted torque request is set to above this range, variations in the immediate torque request that maintain the idle speed can be made using fast actuators without the need to adjust slow actuators.

For example only, spark timing may be a fast actuator value, while throttle opening area may be a slow actuator value. Spark-ignition engines may combust fuels including, for example, gasoline and ethanol, by applying a spark. The spark actuator module 116 may be a fast actuator and the throttle actuator module 107 may be a slow actuator. After receiving a new actuator value, the spark actuator module 116 may be able to change spark timing for a combustion stroke of a next cylinder in the firing order.

By contrast, changes in throttle opening area take longer to affect engine output torque. The throttle actuator module 107 changes the throttle opening area by adjusting the angle of the blade of the throttle valve 106. Therefore, once a new actuator value is received, there is a mechanical delay as the throttle valve 106 moves from its previous position to a new position based on the new actuator value. In addition, air flow changes based on the throttle valve opening are subject to air transport delays in the intake manifold 104. Further, increased air flow in the intake manifold 104 is not realized as an increase in engine output torque until the cylinder 110 receives additional air in the next intake stroke, compresses the additional air, and commences the combustion stroke.

Using these engine actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded from the calibrated spark timing (which reduces torque) based on the immediate torque request. The engine output torque will therefore be equal to the immediate torque request.

When additional torque is needed, some or all of the torque reserve may be utilized by adjusting the spark timing toward the calibrated spark timing. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. The predicted and immediate torque requests received by the propulsion torque arbitration module 206 are converted from the axle torque domain (torque at the wheels) into a propulsion torque domain (torque at the crankshaft).

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, the actuation module 224 may vary the opening of the throttle valve 106 as a slow actuator that allows for a wide range of torque control. The actuation module 224 may disable cylinders, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values for engine airflow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an desired opening of the EGR valve.

The actuation module 224 may also generate a spark torque request and a fuel torque request. The spark torque request may be used by a spark control module 232 to determine how much to retard the spark timing (which reduces engine output torque) from the calibrated spark timing.

A fuel control module 240 may vary the amount of fuel provided to each cylinder based on the fuel torque request from the actuation module 224. During normal operation of a spark-ignition engine, the fuel control module 240 may attempt to maintain a stoichiometric air/fuel mixture by controlling fuel flow based on the APC. More specifically, the fuel control module 240 may determine a fuel mass that will yield stoichiometric combustion when combusted with the current APC. The fuel control module 240 may instruct the fuel actuator module 109 via the fueling rate to inject this fuel mass for each cylinder.

A torque estimation module 244 may estimate torque output of the engine 102. This estimated torque may be used by the air control module 228 to perform closed-loop control of engine air flow parameters, such as throttle area, MAP, and phaser positions. For example, a torque relationship such as $$T=f(\mathrm{APC},S,I,E,\mathrm{AF},\mathrm{OT},\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine the APC based on a measured mass air flowrate (MAF) and the EOS, thereby allowing closed loop air control based on actual air flow. The intake and exhaust cam phaser positions used may be based on actual positions, as the phasers may be traveling toward desired positions.

The actual spark advance may be used to estimate the actual engine output torque. The amount of torque that should be produced during combustion not accounting for frictional losses, engine pumping losses, or accessory loads on the engine 102 may be referred to as an indicated torque. In contrast with an indicated torque, the actual engine torque output may be referred to as a braking torque and may refer to the indicated torque less the accessory loads, the frictional losses, and the engine pumping losses. When the calibrated spark timing is used to estimate torque, the estimated torque may be called an estimated air torque, or simply air torque.

The estimated air torque is an estimate of how much torque the engine 102 could generate at the current air flow if the spark timing was set to the calibrated spark timing and all cylinders were fueled.

The air control module 228 may output a desired area signal to the throttle actuator module 107. The throttle actuator module 107 then regulates the throttle valve 106 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 242 in engine systems including a boost device. The boost scheduling module 242 uses the desired MAP signal to control a boost actuator module. The boost actuator module then controls one or more boost devices. In engine systems without a boost device, the boost scheduling module 242 may be omitted.

The air control module 228 may also output a desired air per cylinder (APC) signal to a phaser scheduling module. Based on the desired APC signal and the EOS signal, a phaser scheduling module 252 may control positions of the intake and/or exhaust cam phasers via a phaser actuator module. In implementations without a cam phaser, the phaser scheduling module 252 may be omitted.

Referring back to the spark control module 232, the calibrated spark timing may vary based on various engine operating conditions. An inverse torque relationship may be used to solve for desired spark advance. For a given torque request ($T_{des}$), the desired spark advance ($S_{des}$) may be determined based on $$S_{des}=T^{-1}(T_{des},\mathrm{APC},I,E,\mathrm{AF},\mathrm{OT},\#). \quad (2)$$

This relationship may be embodied as an equation and/or as a lookup table. The air/fuel ratio (AF) may be the actual air/fuel ratio, as reported by the fuel control module 240.

When the spark advance is set to the calibrated spark timing, the resulting torque may be as close to a mean best torque (MBT) as possible. MBT refers to the maximum engine output torque that may be generated for a given air flow while using fuel having an octane rating greater than a predetermined threshold, using stoichiometric fueling, and with the spark timing set to the calibrated spark timing. The spark advance at which this maximum torque occurs is referred to as MBT spark timing. The calibrated spark timing may differ slightly from MBT spark timing because of, for example, fuel quality (such as when lower octane fuel is used) and environmental factors. The engine output torque produced with the calibrated spark timing may therefore be less than that produced with the MBT spark timing.

The ECM 150 may also include an engine misfire module 260 and a torque balancing module 262. The engine misfire module 260 determines a disturbance term (DT) for the cylinder 110 based on a first derivative of the EOS measured during the combustion stroke of the cylinder 110, a second derivative of the EOS measured during the combustion stroke of the cylinder 110, and a second derivative of the EOS measured during the combustion stroke of a next cylinder that immediately follows the cylinder 110 in the firing order. The first derivative of speed is acceleration, and the second derivative of speed is jerk. In this manner, the engine misfire module 260 determines the DT for the cylinder 110 based on acceleration during the combustion stroke of the cylinder 110, jerk during the combustion stroke of the cylinder 110, and jerk during the combustion stroke of the next cylinder.

The engine misfire module 260 determines an acceleration misfire threshold and a jerk misfire threshold based on various operating parameters. The engine misfire module 260 may diagnose the occurrence of a misfire in the cylinder 110 when the acceleration during the combustion stroke of the cylinder 110 is less than the acceleration misfire threshold and/or the jerk during the combustion stroke of the cylinder 110 is less than the jerk misfire threshold.

The torque balancing module 262 determines a disturbance ratio for the cylinder 110 based on the DT for the cylinder 110 and the jerk misfire threshold. The torque balancing module 262 determines an indicated disturbance torque for the cylinder 110 based on the disturbance ratio and the indicated torque. For the cylinder 110, the torque balancing module 262 averages the indicated disturbance torque determined for the cylinder 110 over a predetermined number of engine cycles. In other words, the torque balancing module 262 determines an average indicated disturbance torque for the cylinder 110 over the predetermined number of engine cycles.

When the average indicated disturbance torque for a given cylinder differs from zero by at least a predetermined amount or percentage, the torque balancing module 262 determines a torque correction for the cylinder. In other words, the torque balancing module 262 determines a torque correction for the cylinder when the cylinder's average indicated disturbance torque is outside of a predetermined range around zero. The torque balancing module 262 may maintain the torque correction for the cylinder when the cylinder's average indicated disturbance torque is within the predetermined range. In other words, the torque balancing module 262 may not update the torque correction and maintain the torque correction at a last torque correction for the cylinder when the cylinder's average indicated disturbance torque is within the predetermined range.

The torque balancing module 262 provides the torque correction for the cylinder to the spark control module 232. The spark control module 232 determines the spark timing for the next combustion event of the cylinder based on the spark torque request. The spark control module 232 also determines a spark timing correction for the next combustion event of the cylinder based on the torque correction. The spark control module 232 corrects the spark timing for the next combustion event of the cylinder based on the spark timing correction and generates the spark timing for the next combustion event of the cylinder at the corrected spark timing. The spark control module 232 similarly corrects the spark timing for other cylinders based on the torque corrections for the other cylinders, respectively. The cylinders then produce approximately equal amounts of torque.

Figure 3:
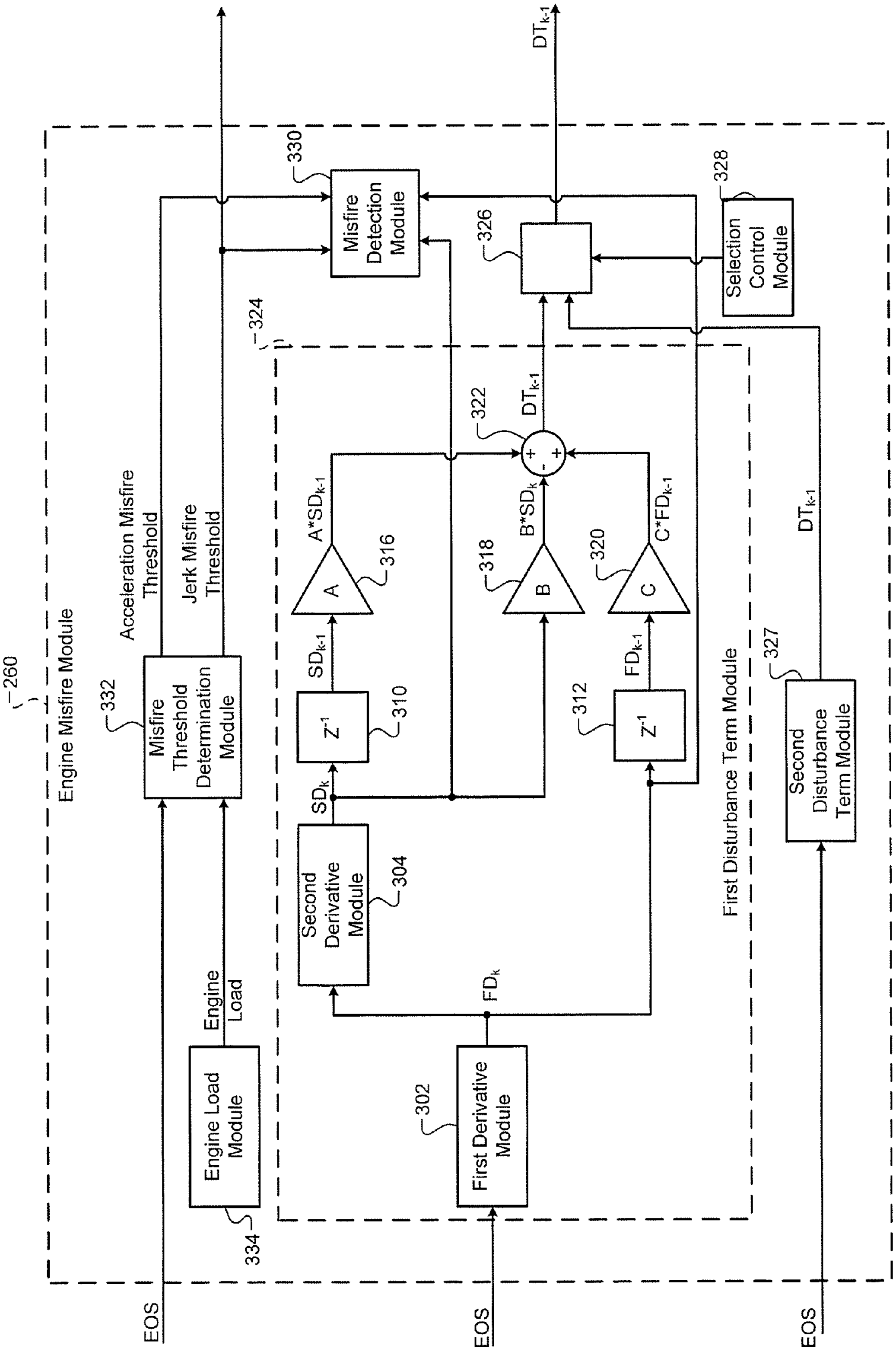
FIG. 3 is a functional block diagram of an exemplary engine misfire module according to the principles of the present disclosure.

Referring now to FIG. 3, a functional block diagram of an exemplary implementation of the engine misfire module 260 is presented. The engine misfire module 260 may include first and second derivative modules 302 and 304, buffer modules 310 and 312, scalar modules 316, 318, and 320, and a summer module 322. The engine misfire module 260 may also include a misfire detection module 330, a misfire threshold determination module 332, and an engine load module 334.

The first derivative module 302 receives the EOS and determines a first derivative of the EOS a k-th cylinder in the firing order based on the EOS during the expansion stroke of the k-th cylinder. In other words, the first derivative module 302 determines an acceleration for the k-th cylinder. k is an integer greater than one and less than the total number of cylinders 110 of the engine 102. The first derivative (FD) for the k-th cylinder is depicted in FIG. 3 as $FD_k$.

The first derivative for the k-th cylinder is output to the second derivative module 304. The second derivative module 304 determines a second derivative for the k-th cylinder based on the first derivative. The second derivative (SD) for the k-th cylinder is depicted in FIG. 3 as $SD_k$. The second derivative module 304 outputs the second derivative for the k-th cylinder to the buffer module 310.

The buffer modules 310 and 312 output a second derivative and a first derivative for a cylinder that immediately precedes the k-th cylinder in the firing order. The cylinder that immediately precedes the k-th cylinder in the firing order will hereafter be referred to as the k−1 cylinder. The second derivative (SD) of the k−1 cylinder is depicted in FIG. 3 as $SD_{k-1}$, and the first derivative (FD) of the k−1 cylinder is depicted in FIG. 3 as $FD_{k-1}$.

The buffer modules 310 and 312 output the second and the first derivatives for the k−1 cylinder to the scalar modules 316 and 320, respectively. The scalar modules 316, 318, and 320 multiply the received derivatives by scalars A, B, and C, respectively. More specifically, the scalar module 316 multiplies the second derivative for the k−1 cylinder by the scalar A. The scalar module 318 multiplies the second derivative for the k-th cylinder by the scalar B. The scalar module 320 multiplies the first derivative for the k−1 cylinder by the scalar C. The derivatives output by the scalar modules 316, 318, and 320, after being multiplied by the scalars A, B, and C, are depicted in FIG. 3 as $A*SD_{k-1}$, $B*SD_k$, and $C*FD_{k-1}$, respectively.

The scalars A, B, and C can be set to adjust the influence or weight that a particular one of the derivatives (i.e., $SD_{k-1}$, $SD_k$, and $FD_{k-1}$) has on the disturbance term determined by the summer module 322 for the k-th cylinder. The scalars A, B, and C may also be set to turn OFF a particular one of the derivative (e.g., by setting the respective scalar equal to 0). In various implementations, the sum of the scalars A and B may be equal to the scalar C, and the sum of the scalars A, B, and C may be approximately 1.0.

The summer module 322 receives the derivatives output by the scalar modules 316, 318, and 320. The summer module 322 determines a disturbance term DT for the k−1 cylinder based on the derivatives output by the scalar modules 316, 318, and 320. More specifically, the summer module 322 determines the disturbance term for the k−1 cylinder based on a sum of the first and second derivatives for the k−1 cylinder, less the second derivative for the k-th cylinder. The disturbance term (DT) for the k−1 cylinder is depicted in FIG. 3 as $DT_{k-1}$.

The summer module 322 determines the disturbance term for the other cylinders of the engine 102 similarly. More specifically, the summer module 322 determines the disturbance term for a given cylinder based on a sum of the first and second derivatives for the given cylinder less the second derivative for a cylinder immediately following the given cylinder in the firing order. For purposes of illustration only, the summer module 322 determines the disturbance term for the given cylinder (k) using the equation:

$$DT_k = A*SD_k + C*FD_k - B*SD_{k+1}, \quad (3)$$

where $DT_k$ is the disturbance term for the given cylinder (i.e., the k-th cylinder in the firing order), $SD_k$ is the second derivative (i.e., jerk) for the given cylinder, $FD_k$ is the first derivative (i.e., acceleration) for the given cylinder, $SD_{k+1}$ is the second derivative for the cylinder immediately following the given cylinder in the firing order (i.e., the k+1 cylinder), and A, B, and C are the scalars.

The first and second derivatives determined for each cylinder may also be provided to the misfire detection module 330. The misfire detection module 330 selectively diagnoses that a misfire occurred within a given cylinder based on the first and second derivatives of the given cylinder. The misfire detection module 330 may determine whether a misfire has occurred within the given cylinder based on comparisons of the first and second derivatives of the given cylinder with the acceleration and jerk misfire thresholds.

The first and second derivative modules 302 and 304, the buffer modules 310 and 312, the scalar modules 316, 318, and 320, and the summer module 322 may be said to be implemented within a first disturbance term module 324. The first disturbance term module 324 determines the derivative terms and provides the disturbance terms to a disturbance term selection module 326. These disturbance terms may be referred to as low resolution disturbance terms.

The engine misfire module 260 may also include a second disturbance term module 327 that is similar or identical to the first disturbance term module 324. The second disturbance term module 327 determines a disturbance term for each of the cylinders of the engine 102. These disturbance terms may be referred to as medium resolution disturbance terms. The difference between the first and second disturbance term modules 324 and 327 is that the first disturbance term module 324 determine the low resolution disturbance terms based on the EOS within a larger range (i.e., a lower resolution) around the TDC position whereas the second disturbance term module 327 determines the medium resolution disturbance terms based on the EOS within a smaller range (i.e., a higher resolution) around the TDC position. For example only, the larger range may be plus or minus 45° of the TDC position, and the smaller range may be plus or minus 15° of the TDC position.

The disturbance term selection module 326 selects one of the low and medium resolution disturbance terms and outputs the selected disturbance term to the torque balancing module 262. The disturbance term selection module 326 may make the selection based on a state of a selection signal. For example only, the disturbance term selection module 326 may select the low resolution disturbance terms when the selection signal is in a first state e.g., 5 V) and select the medium resolution disturbance terms when the selection signal is in a second state (e.g., 0 V).

A selection control module 328 may set the selection signal based on the EOS. For example only, the selection control module 328 may set the selection signal to the first and second states when the EOS is less than greater than a predetermined EOS, respectively, such as approximately 1000 RPM. When the EOS is greater than the predetermined EOS, the medium resolution disturbance terms may reflect an increased amount of noise.

Figure 4:
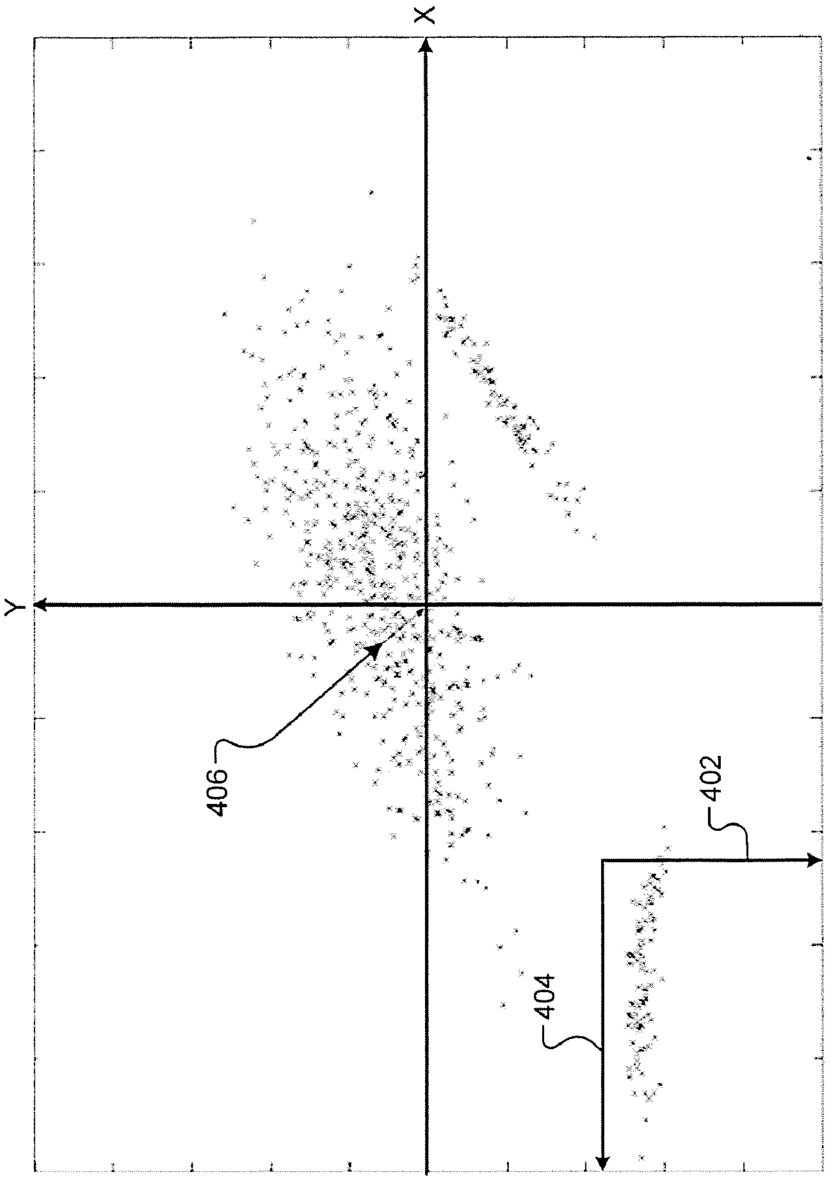
FIG. 4 is an exemplary graph of acceleration versus jerk according to the principles of the present disclosure.

Referring now to FIG. 4, an exemplary graph including samples plotted as functions of first derivative and second derivative is presented. First derivative is depicted by the X-axis, and second derivative is depicted by the Y-axis. Negative first derivative values (i.e., decelerations) appear to the left of the Y-axis, and positive first derivative values (i.e., accelerations) appear to the right of the Y-axis. Positive second derivative values appear above the X-axis, and negative second derivative values appear below the X-axis. Exemplary trace 402 tracks an exemplary acceleration misfire threshold, and exemplary trace 404 tracks an exemplary jerk misfire threshold. Samples that appear near the intersection of the X-axis and the Y-Axis, as illustrated by 406, may indicate a relatively well balanced cylinder as little or no crankshaft acceleration or jerk is present.

Referring back to FIG. 3, the misfire detection module 330 may diagnose a misfire in the given cylinder when the first derivative of the given cylinder is less than the acceleration misfire threshold and the second derivative of the given cylinder is less than the jerk misfire threshold. The misfire threshold determination module 332 determines the misfire thresholds. For example only, the misfire threshold determination module 332 may determine the misfire thresholds based on the EOS and engine load.

The engine load may be expressed as a percentage in terms of the APC during combustion relative to a maximum APC. The engine 102 may be able to produce a maximum amount of torque when the APC is at the maximum APC. The engine load module 334 may determine the engine load using the equation:

$$\text{Engine Load} = \frac{APC}{APC_{MAX}}, \tag{4}$$

where $APC_{MAX}$ is the maximum APC at which the engine 102 may produce the greatest amount of torque.

Figure 5:
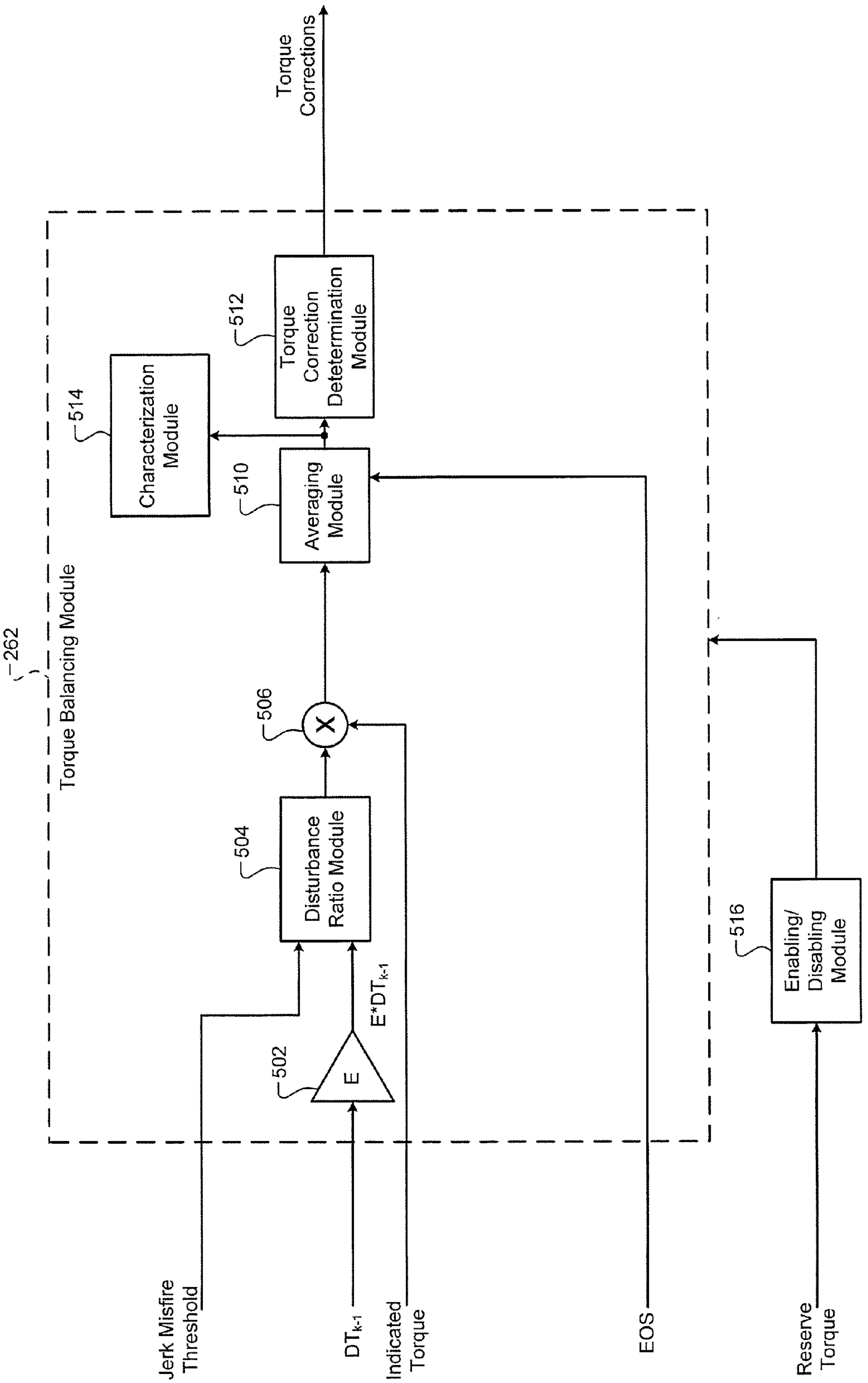
FIG. 5 is a functional block diagram of an exemplary torque balancing module according to the principles of the present disclosure.

Referring now to FIG. 5, a functional block diagram of an exemplary implementation of the torque balancing module 262 is presented. The torque balancing module 262 may include a scalar module 502, a disturbance ratio module 504, and a product module 506. The torque balancing module 262 may also include an averaging module 510 and a torque correction determination module 512.

The scalar module 502 receives the disturbance term for the k−1 cylinder (i.e., $DT_{k-1}$) from the engine misfire module 260. The scalar module 502 multiplies the disturbance term by a scalar E. The scalar may be selectable based on a resolution of the EOS sensor 120. The scalar may be calibratable and may be set such that a disturbance ratio determined by the disturbance ratio module 504 for the k−1 cylinder will be approximately equal to the jerk misfire threshold when a misfire has occurred in the k−1 cylinder. In this manner, the scalar module 502 normalizes the disturbance term with respect to the jerk misfire threshold. The scalar module 502 also receives the disturbance terms for the other cylinders and multiplies the other cylinders' disturbance terms by the scalar E.

The disturbance ratio module 504 receives the disturbance term output by the scalar module 502 for the k−1 cylinder. The disturbance ratio module 504 also receives the jerk misfire threshold from the engine misfire module 260. The disturbance ratio module 504 determines a disturbance ratio for the k−1 cylinder based on a ratio of the disturbance term for the k−1 cylinder to the jerk misfire threshold. More specifically, the disturbance ratio module 504 determines the disturbance ratio for the k−1 cylinder based on a quotient of the disturbance term for the k−1 cylinder over the jerk misfire threshold. For example only, the disturbance ratio module 504 may determine the disturbance ratio for the k−1 cylinder using the equation:

$$DR_{k-1} = \frac{E * DT_{k-1}}{\text{Jerk Threshold}}, \tag{5}$$

where $DR_{k-1}$ is the disturbance ratio for the k−1 cylinder, E is the scalar, $DT_{k-1}$ is the disturbance term for the k−1 cylinder, and jerk threshold is the jerk misfire threshold. In this manner, the disturbance ratio for the k−1 cylinder indicates the relative combustion strength produced by the k−1 cylinder relative to a misfire. The disturbance ratio module 504 may proceed in this manner for the other cylinders of the engine 102.

The product module 506 receives the disturbance ratio for the k−1 cylinder and receives the indicated torque. As described above, the indicated torque refers to the amount of torque that should have been produced during the combustion stroke of the k−1 cylinder. The indicated torque does not account for losses, such as frictional losses and engine pumping losses.

The product module 506 determines an indicated disturbance torque for the k−1 cylinder based on the disturbance ratio and the indicated torque. More specifically, the product module 506 determines the indicated disturbance torque for the k−1 cylinder as the product of the indicated torque and the disturbance ratio of the k−1 cylinder. The product module 506 may proceed in this manner for the other cylinders of the engine 102.

The averaging module 510 receives the indicated disturbance torque for the k−1 cylinder and stores the indicated disturbance torque. The averaging module 510 also receives the indicated disturbance torques for the other cylinders of the engine 102 and stores those indicated disturbance torques.

Once the indicated disturbance torques for a predetermined number of engine cycles have been received, the averaging module 510 averages the indicated disturbance torques determined for each cylinder. In other words, the averaging module 510 determines an average indicated disturbance torque for each of the cylinders based on an average of the indicated disturbance torques for each of the cylinders, respectively, over the predetermined number of engine cycles. One engine cycle refers to two complete revolutions of the crankshaft 112; how long it takes all of the cylinders to experience all four strokes of one combustion cycle. For example only, the predetermined number of engine cycles may be approximately 12.

The averaging module 510 may also determine a maximum one of the average indicated disturbance torques and a minimum one of the average disturbance torques. The averaging module 510 may output the average indicated disturbance torques, the average of the averages, and the maximum and minimum average disturbance torques to the torque correction determination module 512.

The torque correction determination module 512 determines a torque correction for each of the cylinders based on the cylinders' average indicated disturbance torques, respectively. The torque correction determination module 512 may determine the torque correction for a given one of the cylinders based on a comparison of the given cylinder's average indicated disturbance torque and zero (i.e., balanced torque production).

For example only, the torque correction determination module 512 may determine the torque correction for the given cylinder when the given cylinder's average indicated disturbance torque differs from zero by more than a predetermined amount or percentage. In other words, the torque correction determination module 512 may determine the torque correction for the given cylinder when the given cylinder's average indicated disturbance torque is outside of a predetermined range around zero. For example only, the predetermined amount may vary based on the engine 102 and may be between approximately 1.5 Nm and approximately 3.0 Nm. When the average disturbance torque is within the predetermined range, the torque correction determination module 512 may maintain (i.e., not update) the torque correction for the given cylinder.

The torque correction determination module 512 may determine the torque correction for the given cylinder as a difference between the given cylinder's average indicated disturbance torque and a nearest boundary of the predetermined range. In other words, when the given cylinder's average indicated disturbance torque is greater than an upper boundary of the predetermined range, the torque correction determination module 512 may determine the torque correction for the given cylinder as the upper boundary of the range less the given cylinder's average indicated disturbance torque. Conversely, the torque correction determination module 512 may determine the torque correction for the given cylinder as the lower boundary of the range less the given cylinder's average indicated disturbance torque when the given cylinder's average indicated disturbance torque is less than the lower boundary of the predetermined range.

In this manner, the torque correction determination module 512 may (via the torque corrections) decrease the torque produced by cylinders with average indicated disturbance torques above the predetermined range during the cylinders future combustion strokes. Similarly, the torque correction determination module 512 may increase the torque produced by cylinders with average indicated disturbance torques below the predetermined range. The torque correction determination module 512 may leave the torque produced by cylinders with average indicated disturbance torques within the predetermined range uncorrected.

The torque correction determination module 512 outputs the torque corrections for the cylinders, respectively, to the spark control module 232. The torque correction determination module 512 may also ensure that a sum of the torque corrections is approximately zero or within a predetermined range centered at zero before outputting the torque corrections.

The torque balancing module 262 may also include a characterization module 514 that selectively characterizes the cylinders. For example only, the characterization module 514 may characterize a given cylinder as being strong when the given cylinder's average indicated disturbance torque is greater than the upper boundary of the predetermined range. The characterization module 514 may characterize the given cylinder as being weak when the given cylinder's average indicated disturbance torque is less than the lower boundary of the predetermined range.

An enabling/disabling module 516 may also selectively enable and disable the torque balancing module 262. The enabling/disabling module 516 may be implemented, for example, to limit the times of operation of the torque balancing module 262 to when one or more enabling conditions are satisfied. For example only, the enabling/disabling module 516 may enable the torque balancing module 262 when the torque reserve is greater than zero. When the torque reserve is zero, the enabling/disabling module 516 may disable the torque balancing module 262. Other enabling conditions may include, for example, whether the engine 102 is idling. For example, the enabling/disabling module 516 may enable the torque balancing module 262 when the EOS is approximately equal to a predetermined idle EOS. The enabling/disabling module 516 may disable the torque balancing module 262 when the EOS is greater than the predetermined idle EOS.

Figure 6:
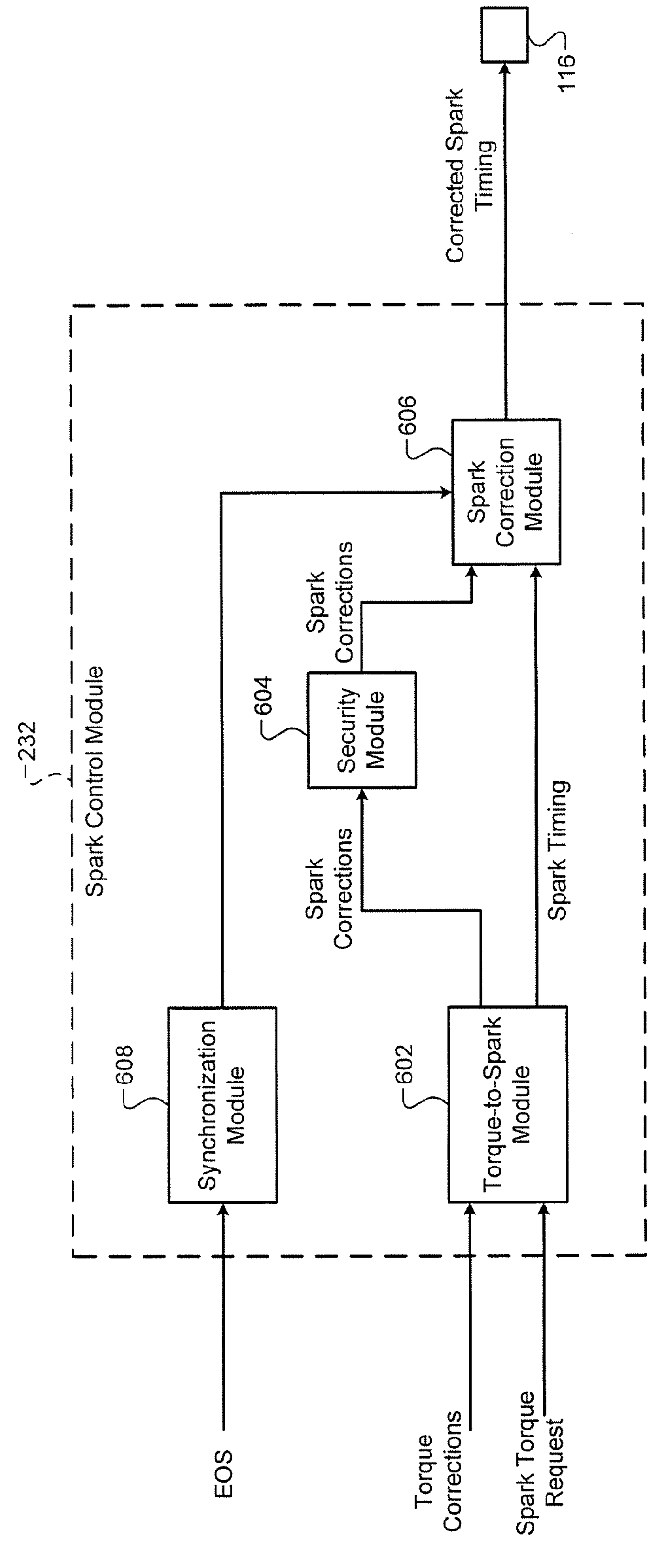
FIG. 6 is a functional block diagram of an exemplary spark control module according to the principles of the present disclosure.

Referring now to FIG. 6, a functional block diagram of an exemplary implementation of the spark control module 232 is presented. The spark control module 232 may include a torque-to-spark module 602, a security module 604, a spark correction module 606, and a synchronization module 608.

The torque-to-spark module 602 receives the spark torque request from the actuation module 224 and the torque corrections from the torque balancing module 262. The torque-to-spark module 602 converts the spark torque request into an uncorrected spark timing. The torque-to-spark module 602 also adds the torque correction to the spark torque request to determine an absolute spark torque request and converts the absolute spark torque request into an absolute spark timing. The torque-to-spark module 602 may make the conversions using an inverse torque relationship, such as relationship (2) discussed above. For example only, the torque-to-spark module 602 may use the following equations:

$$S_{UN}=T^{-1}(T_{Spark},\mathrm{APC},I,E,\mathrm{AF},\mathrm{OT},\#), \quad (6)$$

$$S_A=T^{-1}(T_A,\mathrm{APC},I,E,\mathrm{AF},\mathrm{OT},\#),\text{ and} \quad (7)$$

$$\text{Spark Correction}=S_{UN}-S_A, \quad (8)$$

where $S_{UN}$ is the uncorrected spark timing, $T_{Spark}$ is the spark torque request, $S_A$ absolute is the absolute spark timing, $T_A$ is the absolute spark torque request, and Spark Correction is the spark correction. In various implementations, the torque-to-spark module 602 may determine the absolute spark timing using the equation:

$$S_A=T^{-1}(T_{Spark}+\text{Torque Correction},\mathrm{APC},I,E,\mathrm{AF},\mathrm{OT},\#), \quad (9)$$

where Torque Correction is the torque correction.

The torque-to-spark module 602 may also verify that the spark correction would not use more than a predetermined percentage of the torque reserve and that the spark correction could not cause an acceleration or deceleration that is greater than a predetermined amount, that the spark correction would not cause the spark timing to be advanced past the calibrated spark timing, and that the spark correction would not decrease the torque produced by the associated cylinder more than the predetermined percentage toward a predetermined minimum engine torque. For example only, the predetermined percentage may be approximately 90 percent, and the predetermined amount may be approximately 0.2 g over 200 ms. The predetermined minimum engine torque may refer to an indicated torque produced with the spark timing retarded as much as possible while maintaining proper combustion.

If the correction would cause any of the above to occur, the torque-to-spark module 602 may notify the torque balancing module 262 so torque balancing module 262 does not adjust the torque correction further and exacerbate the issue. Additionally, if the spark correction would cause one of the above to occur, the torque-to-spark module 602 may selectively limit one or more of the spark corrections before providing the spark corrections to the spark correction module 606. For example only, the torque-to-spark module 602 may decrease the spark correction when the torque correction is greater than the predetermined percentage of the torque reserve. The torque-to-spark module 602 may increase the spark correction when a difference between the indicated torque and the torque correction is less than a torque corresponding to a sum of the predetermined minimum engine torque and a product of the predetermined minimum engine torque and a difference between 100 percent and the predetermined percentage. For example only, when the predetermined percentage is 90 percent, the torque-to-spark module 602 may increase the spark correction when a difference between the indicated torque and the torque correction is less than 110 percent of the predetermined minimum engine torque. If the spark correction would cause an acceleration or deceleration that is greater than the predetermined amount, the torque-to-spark module 602 may decrease or increase the spark correction, respectively. If the sum of the spark corrections is less than or greater than the predetermined range around zero, the torque-to-spark module 602 may increase or decrease the spark correction, respectively. In various implementations, the torque balancing module 262 may make one or more of the above verifications and limitations before the torque corrections are provided to the spark control module 232.

The security module 604 receives the spark corrections and secures the spark corrections. For each of the spark corrections, the security module 604 may, for example, redundantly calculate the spark correction. More specifically, the security module may determine a second spark correction similarly or identically to the torque-to-spark module 602.

The security module 604 may determine whether a difference between the spark correction and the redundant correction is greater than a predetermined amount. If the difference is less than the predetermined amount, the security module 604 provides the spark correction to the spark correction module 606. If the difference is greater than the predetermined amount, the security module 604 may set the spark correction equal to a previous spark correction (where the difference was determined to be less than the predetermined amount) and provide that spark correction to the spark correction module 606. Additionally, if the difference is greater than the predetermined amount, the security module 604 may notify the torque correction module 612, and the torque correction module 612 may set the torque corrections equal to zero.

The spark correction module 606 receives the uncorrected spark timing for a next cylinder in firing order and the spark corrections. The spark correction module 606 determines a corrected spark timing for the next cylinder based on a sum of the uncorrected spark timing and the spark correction for the next cylinder. The spark correction module 606 initiates combustion within the next cylinder based on the corrected spark timing.

The spark correction module 606 may synchronize the spark corrections for the cylinders with the cylinders, respectively, using a synchronization signal from the synchronization module 608. For example only, the synchronization module 608 may generate the synchronization signal indicating which of the cylinders is the next cylinder in the firing order based on the EOS.

Figure 7:
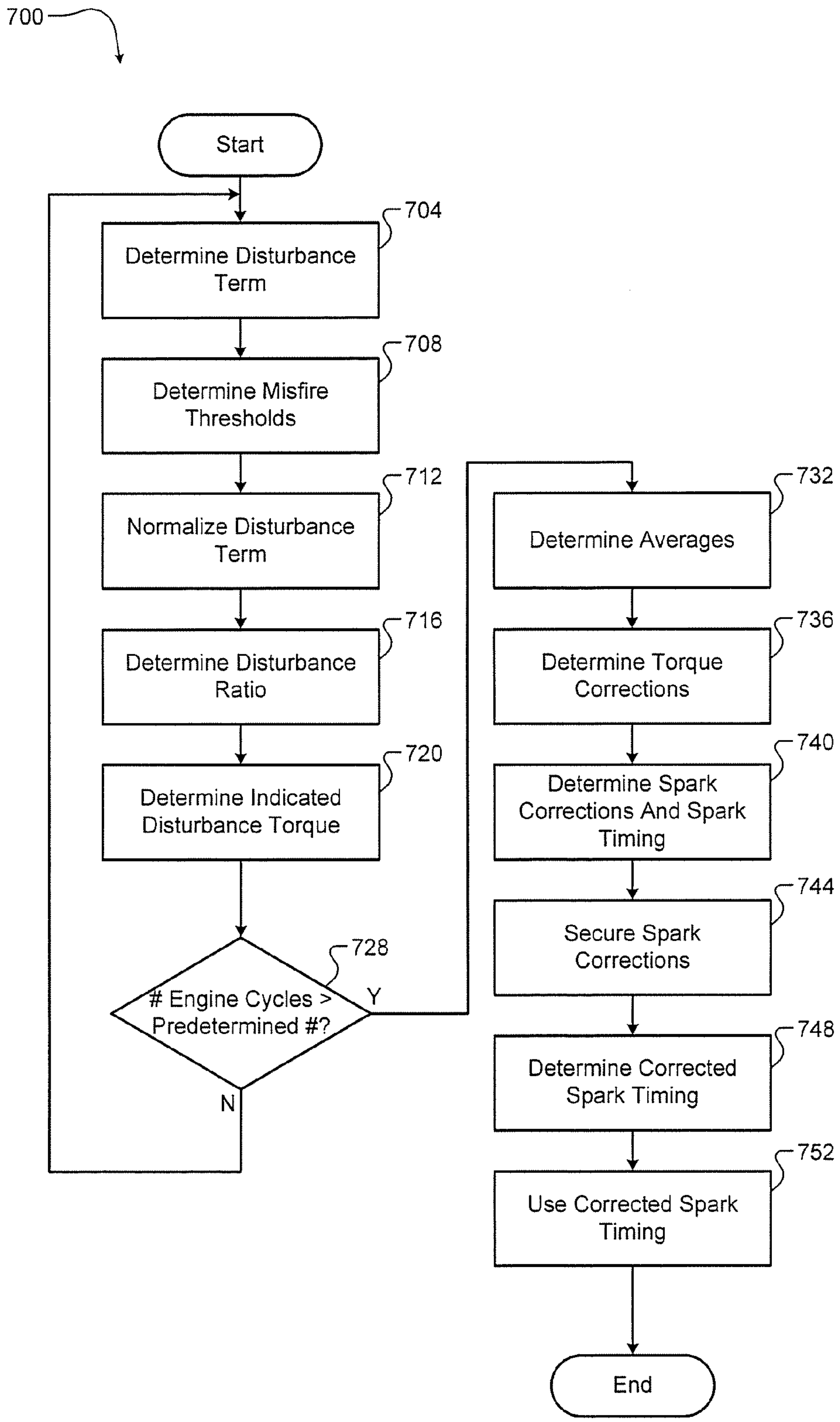
FIG. 7 is a flowchart depicting an exemplary method of cylinder torque balancing according to the principles of the present disclosure.

Referring now to FIG. 7, a flowchart depicting an exemplary method 700 of torque balancing for the cylinder 110 is presented. Control may begin with 704 where control determines the disturbance term (DT) for the cylinder 110. Control determines the DT for a given cylinder of the engine 102 based on the first derivative of the EOS during the combustion stroke of the given cylinder, the second derivative of the EOS during the combustion stroke of the given cylinder, and the second derivative of the EOS during the combustion stroke of a cylinder immediately following the given cylinder in the firing order.

Control determines the acceleration misfire threshold and the jerk misfire threshold at 708. Control determines the misfire thresholds based on, for example, the EOS and the engine load. Control normalizes the DT of the cylinder 110 with respect to the jerk misfire threshold at 712 by multiplying the DT of the cylinder 110 by the scalar E. In this manner, the normalized DT will be approximately equal to the jerk misfire threshold if the cylinder 110 has experienced a misfire.

Control determines the disturbance ratio for the cylinder 110 at 716. Control determines the disturbance ratio for the cylinder 110 based on the ratio of the normalized DT to the jerk misfire threshold. Control determines the indicated disturbance torque at 720. Control determines the indicated disturbance torque as a product of the indicated torque (i.e., how much torque the cylinder 110 should have produced during the combustion stroke) and the disturbance ratio.

At 728, control determines whether the predetermined number of engine cycles have been completed. In other words, control determines whether the predetermined number of indicated disturbance torques have been determined for each of the cylinders of the engine 102 at 728. If false, control may return to 704; if true, control may continue with 732.

At 732, when the predetermined number of engine cycles have been completed, control determines an average indicated disturbance torque for each of the cylinders. Control may also determine a maximum and a minimum one of the average indicated disturbance torques. Control determines a torque correction for each of the cylinders at 736. Control determines the torque corrections based on the average indicated disturbance torques of the cylinders, respectively. Control may also ensure that the sum of the torque corrections is equal to zero at 736.

Control determines an uncorrected spark timing for a next one of the cylinders in the firing order based on the spark torque request at 740 based on the spark torque request. Control also determines a spark timing correction for the next cylinder in the firing order at 740. Control may determine the spark timing correction by adding the torque correction for the next cylinder to the spark torque request to determine the absolute spark torque request. Control may convert the absolute spark torque request into the absolute spark timing and determine the spark timing correction based on the difference between the uncorrected spark timing and the absolute spark timing. The spark timing corrections may be used to correct the uncorrected spark timings associated with each of the cylinders, respectively, during a next predetermined number of engine cycles.

Control secures the spark corrections at 744. For example only, control may determine a redundant spark timing correction and determine whether spark timing correction and the redundant spark timing correction differ by more than a predetermined amount. If so, control may set the spark timing correction to a previous (good) spark timing correction. If not, control may use the spark timing correction.

Control determines the corrected spark timing for the next cylinder in the firing order based on the uncorrected spark timing and the spark timing correction for the next cylinder at 748. Control initiates combustion within the next cylinder during the combustion stroke of the next cylinder using the corrected spark timing at 752. Control may then end.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:

a disturbance module that determines a disturbance value for a past combustion stroke of a cylinder based on rotation of a crankshaft;

a misfire threshold determination module that determines a jerk value indicative of a misfire within the cylinder;

a disturbance ratio module that determines a disturbance ratio for the past combustion stroke based on the disturbance value and the jerk value; and a spark control module that determines a spark timing for a future combustion stroke of the cylinder, that determines a spark timing correction for the future combustion stroke based on the disturbance ratio, that determines a corrected spark timing based on the spark timing and the spark timing correction, and that generates spark during the future combustion stroke based on the corrected spark timing.

2. The engine control system of claim 1 further comprising:

an indicated disturbance module that determines an indicated disturbance torque for the past combustion event based on the disturbance ratio and an expected torque production of the cylinder for the past combustion event;

an averaging module that determines an average indicated disturbance torque for the cylinder based on the indicated disturbance torque and a predetermined number of other indicated disturbance torques determined for other past combustion strokes of the cylinder, respectively; and a torque correction module that selectively determines a torque correction for the future combustion stroke based on the average indicated disturbance torque, wherein the spark control module determines the spark timing correction based on the torque correction.

3. The engine control system of claim 2 wherein the torque correction module determines the torque correction further based on zero.

4. The engine control system of claim 2 wherein the torque correction module sets the torque correction based on a difference between the average indicated disturbance torque and zero.

5. The engine control system of claim 2 wherein the torque correction module maintains the torque correction at a last torque correction when the average indicated disturbance torque is within a predetermined amount of zero.

6. The engine control system of claim 2 wherein the torque correction module sets the torque correction based on a first difference between the average indicated disturbance torque and a predetermined amount when a second difference between the average indicated disturbance torque and zero is greater than the predetermined amount.

7. The engine control system of claim 2 further comprising a characterization module that selectively characterizes the cylinder as being strong when the average indicated disturbance torque is greater than zero, wherein the torque correction module selectively sets the torque correction to reduce torque produced during the future combustion stroke when the cylinder is characterized as being strong.

8. The engine control system of claim 2 further comprising a characterization module that selectively characterizes the cylinder as being weak when the average indicated disturbance torque is less than zero, wherein the torque correction module selectively sets the torque correction to increase torque produced during the future combustion stroke when the cylinder is characterized as being weak.

9. The engine control system of claim 1 wherein the spark control module determines the corrected spark timing based on a sum of the spark timing and the spark timing correction.

10. The engine control system of claim 1 wherein the disturbance module determines the disturbance value based on a first derivative of a rotational speed of the crankshaft measured during the past combustion stroke, a second derivative of the rotational speed measured during the past combustion stroke, and a second derivative of the rotational speed measured during a combustion stroke of a next cylinder in a predetermined firing order.

11. An engine control method comprising:

determining a disturbance value for a past combustion stroke of a cylinder based on rotation of a crankshaft;

determining a jerk value indicative of a misfire within the cylinder;

determining a disturbance ratio for the past combustion stroke based on the disturbance value and the jerk value;

determining a spark timing for a future combustion stroke of the cylinder;

determining a spark timing correction for the future combustion stroke based on the disturbance ratio;

determining a corrected spark timing based on the spark timing and the spark timing correction; and generating spark during the future combustion stroke based on the corrected spark timing.

12. The engine control method of claim 11 further comprising:

determining an indicated disturbance torque for the past combustion event based on the disturbance ratio and an expected torque production of the cylinder for the past combustion event;

determining an average indicated disturbance torque for the cylinder based on the indicated disturbance torque and a predetermined number of other indicated disturbance torques determined for other past combustion strokes of the cylinder, respectively; and selectively determining a torque correction for the future combustion stroke based on the average indicated disturbance torque; and determining the spark timing correction based on the torque correction.

13. The engine control method of claim 12 further comprising determining the torque correction further based on zero.

14. The engine control method of claim 12 further comprising setting the torque correction based on a difference between the average indicated disturbance torque and zero.

15. The engine control method of claim 12 further comprising maintaining the torque correction at a last torque correction when the average indicated disturbance torque is within a predetermined amount of zero.

16. The engine control method of claim 12 further comprising setting the torque correction based on a first difference between the average indicated disturbance torque and a predetermined amount when a second difference between the average indicated disturbance torque and zero is greater than the predetermined amount.

17. The engine control method of claim 12 further comprising:

selectively characterizing the cylinder as being strong when the average indicated disturbance torque is greater than zero; and selectively setting the torque correction to reduce torque produced during the future combustion stroke when the cylinder is characterized as being strong.

18. The engine control method of claim 12 further comprising:

selectively characterizing the cylinder as being weak when the average indicated disturbance torque is less than zero; and selectively setting the torque correction to increase torque produced during the future combustion stroke when the cylinder is characterized as being weak.

19. The engine control method of claim 11 further comprising determining the corrected spark timing based on a sum of the spark timing and the spark timing correction.

20. The engine control method of claim 11 further comprising determining the disturbance value based on a first derivative of a rotational speed of the crankshaft measured during the past combustion stroke, a second derivative of the rotational speed measured during the past combustion stroke, and a second derivative of the rotational speed measured during a combustion stroke of a next cylinder in a predetermined firing order.

* * * * *